US011952916B2

(12) United States Patent
Stoyanov et al.

(10) Patent No.: US 11,952,916 B2
(45) Date of Patent: Apr. 9, 2024

(54) SELF-LUBRICATING BLADE ROOT/DISK INTERFACE

(71) Applicant: Raytheon Technologies Corporation, Farmington, CT (US)

(72) Inventors: Pantcho P. Stoyanov, West Hartford, CT (US); Kelly M. Harrington, Wethersfield, CT (US); Thomas D. Kasprow, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 16/993,326

(22) Filed: Aug. 14, 2020

(65) Prior Publication Data

US 2022/0049611 A1 Feb. 17, 2022

(51) Int. Cl.
*F01D 5/30* (2006.01)
*F01D 5/28* (2006.01)

(52) U.S. Cl.
CPC ........... *F01D 5/3092* (2013.01); *F01D 5/288* (2013.01); *F05D 2260/98* (2013.01); *F05D 2300/611* (2013.01)

(58) Field of Classification Search
CPC .. F01D 5/3092; F01D 5/288; F05D 2300/611; F05D 2260/98
See application file for complete search history.

(56) References Cited

U.S. PATENT DOCUMENTS 4,425,247 A * 1/1984 Bely .................... C10M 103/02 75/229
4,659,282 A * 4/1987 Popp ...................... F01D 25/08 165/47
5,160,243 A 11/1992 Herzner et al.
5,302,450 A 4/1994 Rao et al.
5,356,545 A * 10/1994 Wayte .................. C10M 169/04 508/138
6,751,863 B2 * 6/2004 Tefft .......................... C23C 4/00 219/121.47
9,835,199 B2 * 12/2017 Sun ........................... C22C 9/02
9,945,295 B2 4/2018 Porter et al.
2006/0216429 A1 * 9/2006 Bengtsson ................ C23C 4/12 427/446
2006/0292398 A1 * 12/2006 Vigneau ............... C10M 103/02 428/698

(Continued)

FOREIGN PATENT DOCUMENTS

CN 101954676 B 10/2013
DE 102017130965 A1 6/2019

(Continued)

OTHER PUBLICATIONS

EP Search Report dated Jan. 13, 2022 issued for corresponding European Patent Application No. 21191546.7.

*Primary Examiner* — Woody A Lee, Jr.
*Assistant Examiner* — Eric A Lange
(74) *Attorney, Agent, or Firm* — Bachman & LaPointe, P.C.

(57) ABSTRACT

A coating for a blade root/disk interface includes a layer of soft metal matrix, and a solid lubricant distributed through the soft metal matrix. Examples of materials include CuAl as the soft metal matrix and $MoS_2$ as the solid lubricant, although others are also disclosed.

7 Claims, 5 Drawing Sheets

(56) References Cited

U.S. PATENT DOCUMENTS

| | | | | |
|---|---|---|---|---|
| 2014/0272393 | A1 * | 9/2014 | Naik | B23P 6/007 427/419.7 |
| 2018/0291815 | A1 | 10/2018 | Munson et al. | |
| 2020/0056506 | A1 | 2/2020 | Stoyanov et al. | |
| 2020/0148340 | A1 | 5/2020 | Poteet et al. | |

FOREIGN PATENT DOCUMENTS

| | | | |
|---|---|---|---|
| EP | 0496503 | A1 | 7/1992 |
| WO | 96/41068 | A1 | 12/1996 |
| WO | 2005/068670 | A1 | 7/2005 |

* cited by examiner

SELF-LUBRICATING BLADE ROOT/DISK INTERFACE

BACKGROUND OF THE DISCLOSURE

The disclosure relates to a coating and lubrication strategy for blade root interfaces, more particularly for blade root/disk interfaces of components of gas turbine engines.

Fretting wear at the disk/blade root interface, for example in fans, low pressure compressors, high pressure compressors and other portions of gas turbine engines is a major concern.

Fretting wear can result in high wear and cracking of components including the blade root and the disk in which the blade root is mounted.

Typical blade roots are made of titanium alloy, and a solid lubricant can be applied at both surfaces (i.e. to the blade root and also the disk), and/or a thermal spray coating can be applied on the blade root. However, this can realistically be done only once on both surfaces, prior to engine operation.

The applied solid lubricant wears out, and the underlying components have poor tribological behavior under the high contact stresses and the high vibratory energy in the system. Thus, known systems are not capable of effectively operating under the harsh conditions, resulting continuously in premature failure of the blade root due to wear issues.

Besides the need to constantly replace blades after wear or cracking of the blade root, this problem also frequently leads to further damage to more critical/expensive parts, such as the disk.

SUMMARY OF THE DISCLOSURE

The present disclosure relates to a lubrication strategy of the blade root/disk interface which results in continuous self-lubrication at the interface, resulting in low friction and wear.

In one non-limiting configuration, a coating for a blade root/disk interface comprises a layer of soft metal matrix, and a solid lubricant distributed through the soft metal matrix.

In a further non-limiting configuration, the soft metal matrix is a composition of a first component selected from the group consisting of copper, nickel and mixtures thereof, and a second component different from the first component and selected from the group consisting of nickel, aluminum, indium and combinations thereof.

In a still further non-limiting configuration, the soft metal matrix is CuAl.

In another non-limiting configuration, the solid lubricant is selected from the group consisting of molybdenum disulfide, hexagonal boron nitride, graphite and combinations thereof.

In still another non-limiting configuration, the solid lubricant is molybdenum disulfide.

In a further non-limiting configuration, the layer has a thickness of between 0.001 and 0.005 inches.

In a still further non-limiting configuration, the layer contains between 10 and 20 weight percent of solid lubricant, and between 80 and 90 weight percent of soft metal matrix.

In another non-limiting configuration, the soft metal matrix comprises CuAl, and the layer contains between 2 and 8 weight percent of aluminum, and balance copper.

In still another non-limiting configuration, the coating, when exposed to wear, generates a solid lubricant-based tribofilm at a wear surface.

In one non-limiting configuration, a coated blade root/disk interface comprises a blade root mounted in a disk with contact surfaces defining at least one interface between the blade root and the disk; and a coating at the at least one interface, wherein the coating comprises a layer of soft metal matrix, and a solid lubricant distributed through the soft metal matrix.

In another non-limiting configuration, the at least one interface is defined by a blade root surface and an opposed disk surface, and the coating is on at least one of the blade root surface and the opposed disk surface.

In still another non-limiting configuration, the coating is on both of the blade root surface and the opposed disk surface.

In a further non-limiting configuration, the soft metal matrix is a composition of a first component selected from the group consisting of copper, nickel and mixtures thereof, and a second component, different from the first component and selected from the group consisting of nickel, aluminum, indium and combinations thereof.

In a still further non-limiting configuration, the soft metal matrix is CuAl.

In another non-limiting configuration, the solid lubricant is selected from the group consisting of molybdenum disulfide, hexagonal boron nitride, graphite and combinations thereof.

In still another non-limiting configuration, the solid lubricant is molybdenum disulfide.

In a further non-limiting configuration, the layer has a thickness of between 0.001 and 0.005 inches.

In a still further non-limiting configuration, the layer contains between 10 and 20 weight percent of solid lubricant, and between 80 and 90 weight percent of soft metal matrix.

In another non-limiting configuration, the soft metal matrix comprises CuAl, and the layer contains between 2 and 8 weight percent of aluminum, and balance copper.

In still another non-limiting configuration, the coating, when exposed to wear, generates a solid lubricant-based tribofilm at a wear surface.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

A detailed description of preferred embodiments of the disclosure follows, with referenced to the attached drawings, wherein.

Like reference numbers and designations in the various drawings indicate like elements.

DETAILED DESCRIPTION

The present disclosure relates to a coating and coating strategy that is particularly useful in protecting the blade root and disk of fan and compressor components of turbomachinery such as gas turbine engines.

Gas turbine engines typically have a number of fans and compressors which each comprise a plurality of blades that are mounted to disks through blade roots that are received in sockets of the disk. During operation, the blade roots and sockets are subject to fretting wear that can lead to failure of the blade root, as well as damage to the disk.

Figure 1:
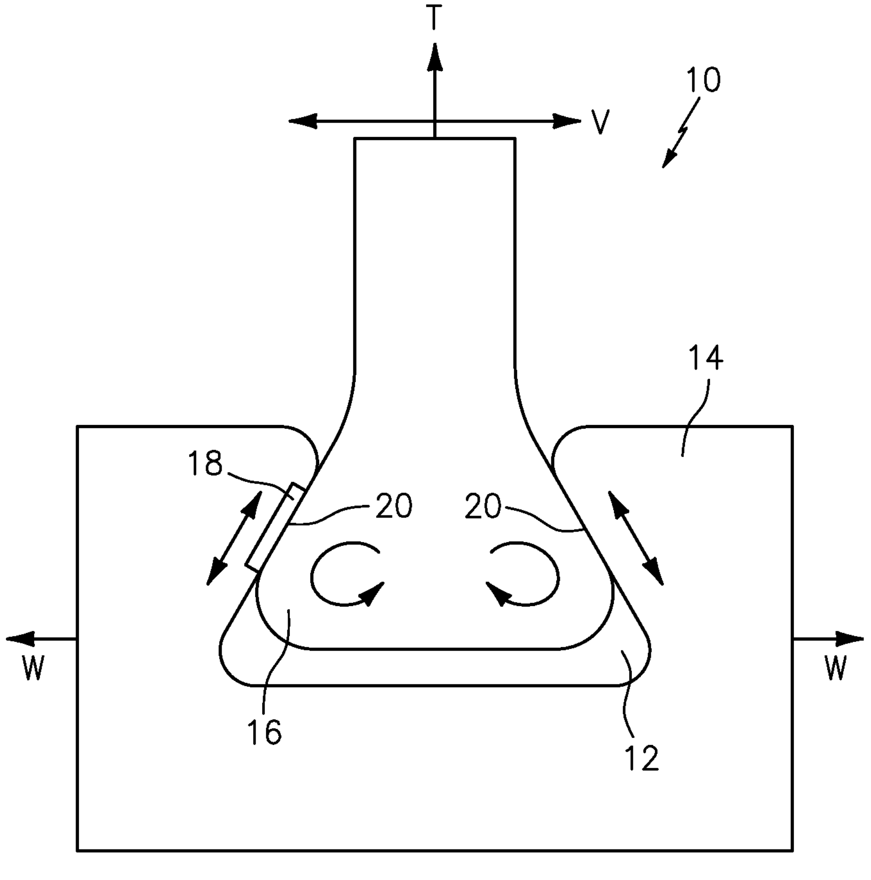
FIG. 1 schematically illustrates blade root/disk interfaces and areas of wear.

FIG. 1 shows a blade 10 in a socket 12 of a disk 14. In a gas turbine engine, a plurality of blades 10 would be mounted around the circumference of the disk in a plurality of sockets 12. As shown, blade 10 has a root 16 which in this case has a widened profile to engage within socket 12. No particular shape of root 16 and socket 12 is implied as being necessary, and numerous different shapes and configurations are expected.

During operation of a gas turbine engine containing a blade 10 and disk 14 assembly as shown, forces and stresses are applied to both blade 10 and disk 14, and socket 12, for example where shown at arrows T, V and W. This leads to a fretting wear between contacting surfaces of blade root 16 and socket 12 of disk 14, and one area of fretting wear is identified at 18 in FIG. 1. The fretting that occurs at areas 18, 20 and other zones causes friction and heating of surfaces of the components, and this friction and heating can lead to damage such as cracks and the like, which result in the need to remove the gas turbine engine from operation and replace the damaged parts.

Figure 2:
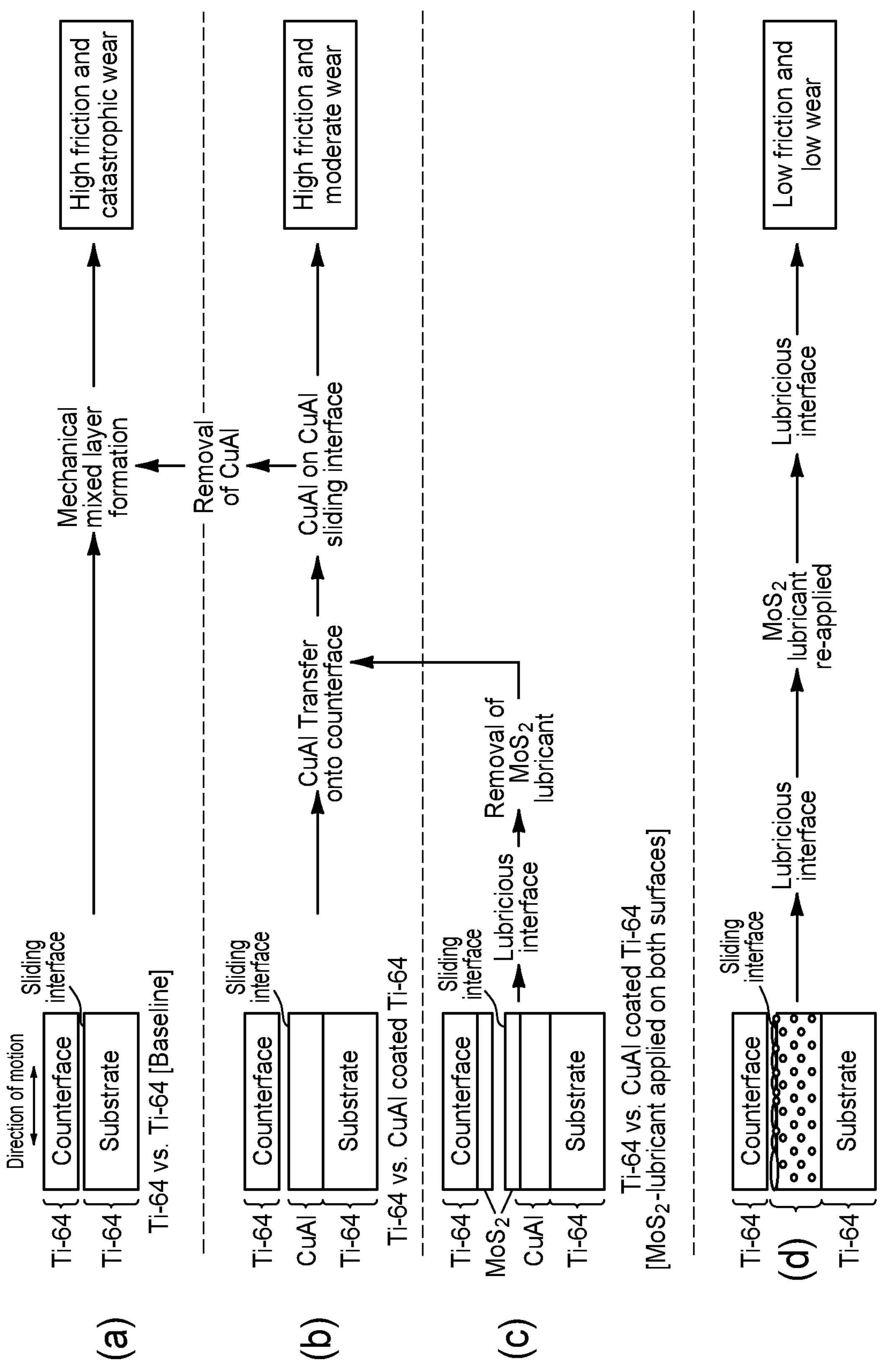
FIG. 2 illustrates a series of different attempts made to address wear at the blade root/disk interface, and the method disclosed herein.

Blade roots 16 and the surfaces of sockets 12 of disks 14 are typically manufactured from a titanium alloy. One example of titanium alloy that can be utilized is Ti-64, although other titanium alloys are also useful. While titanium alloys have excellent properties in terms of strength, toughness and weight, when they are in contact with each other under load with relative motion, they create an interface that forms a mechanical mixed layer, leading to high friction and significant wear. FIG. 2 shows a series of strategies that have been utilized to try to address this issue. At the top of FIG. 2, shown at (a), a baseline configuration is illustrated showing Ti-64 vs. Ti-64. This results in high friction and catastrophic wear as mentioned above.

One strategy for protecting the titanium alloy components, shown in FIG. 2 at (b), is to apply a coating of soft metal composition or alloy such as CuAl alloy. When this material is applied as a coating to one surface of an interface, it transfers to the other surface during use, and establishes a CuAl on CuAl sliding interface that still generates high friction, but only leads to moderate wear. However, during operation this CuAl coating is removed, ultimately leading to the same high friction and significant wear as in the example where no coating is used. Other coatings that have been utilized in this strategy include CuNiIn and CuNi, with similar issues.

Another strategy, shown in FIG. 2 at (c), has been to apply a soft metal alloy such as CuAl to one surface of the interface, and then apply a lubricant such as molybdenum disulfide ($MoS_2$) to one or both surfaces. This creates a lubricious interface that has good wear behavior, until the lubricant wears off. Then, the interface transitions into the second example where CuAl coats both sides of the interface and leads to high friction and moderate wear. And, this leads eventually to removal of the CuAl coating, leading to the original high friction and significant wear environment as discussed initially.

Finally, in FIG. 2 at (d), a representation of the present disclosure is made, wherein a coating of co-deposited CuAl and $MoS_2$ is applied, leading to continuous application of the $MoS_2$ to maintain a lubricious interface as desired.

$MoS_2$ is effective at reducing the friction and wear, but it is difficult or impossible to keep this lubricant in place because it is hard to apply this coating after an engine has been manufactured. Thus, engines having interfaces that have been coated with a $MoS_2$ lubricant at the interface operate with good properties until such time as the lubricant wears out. This is as is illustrated in FIG. 2, at (a), (b) and (c) as discussed above.

Figure 3:
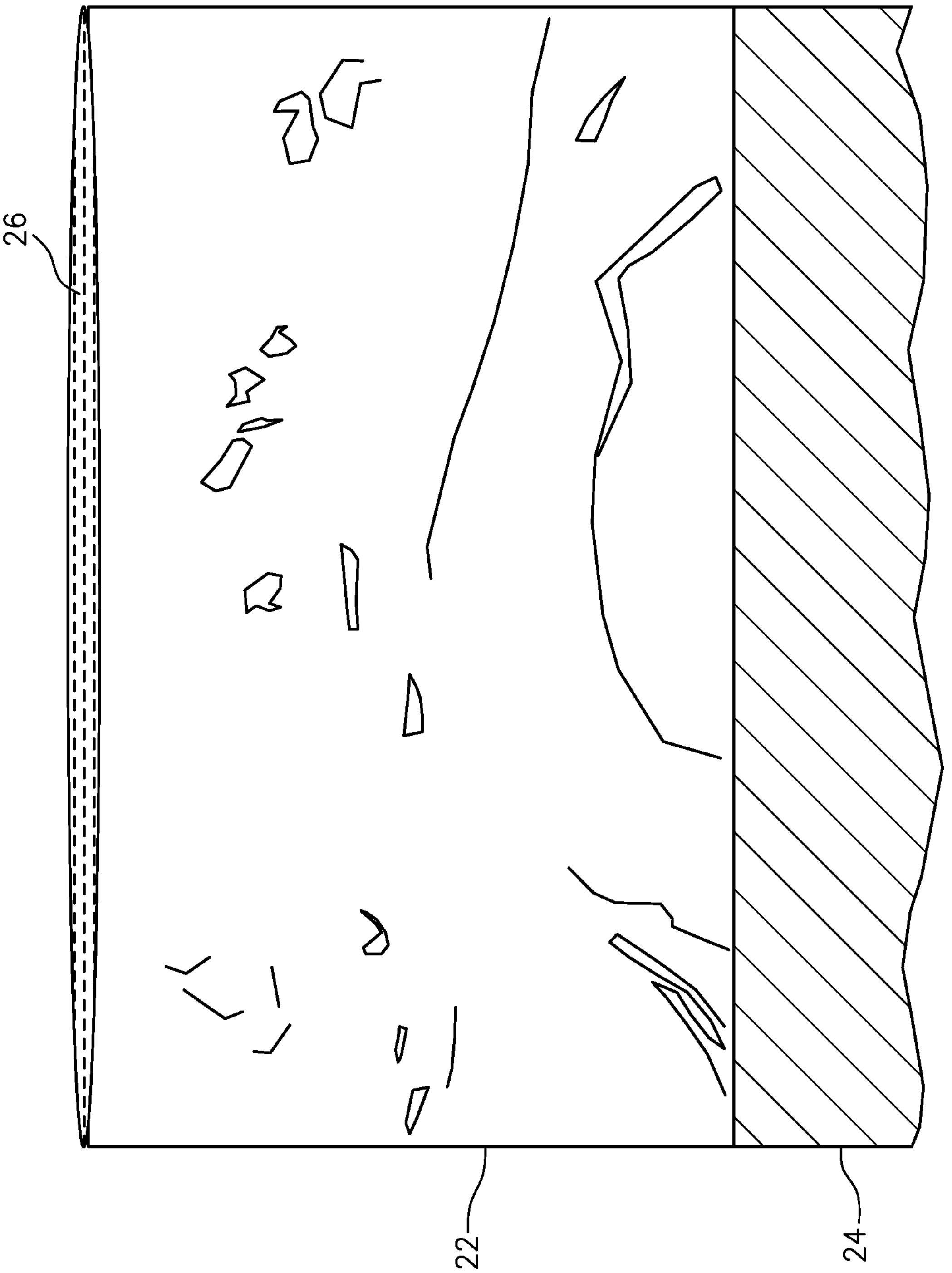
FIG. 3 illustrates coating of CuAl having a layer of solid lubricant at a wear surface.

FIG. 3 shows a CuAl coating 22 on a substrate 24, with an $MoS_2$ layer 26 on top of the CuAl. This corresponds to the strategy discussed above, wherein the $MoS_2$ creates a good sliding interface for a short time, until the $MoS_2$ is worn off.

Figure 4:
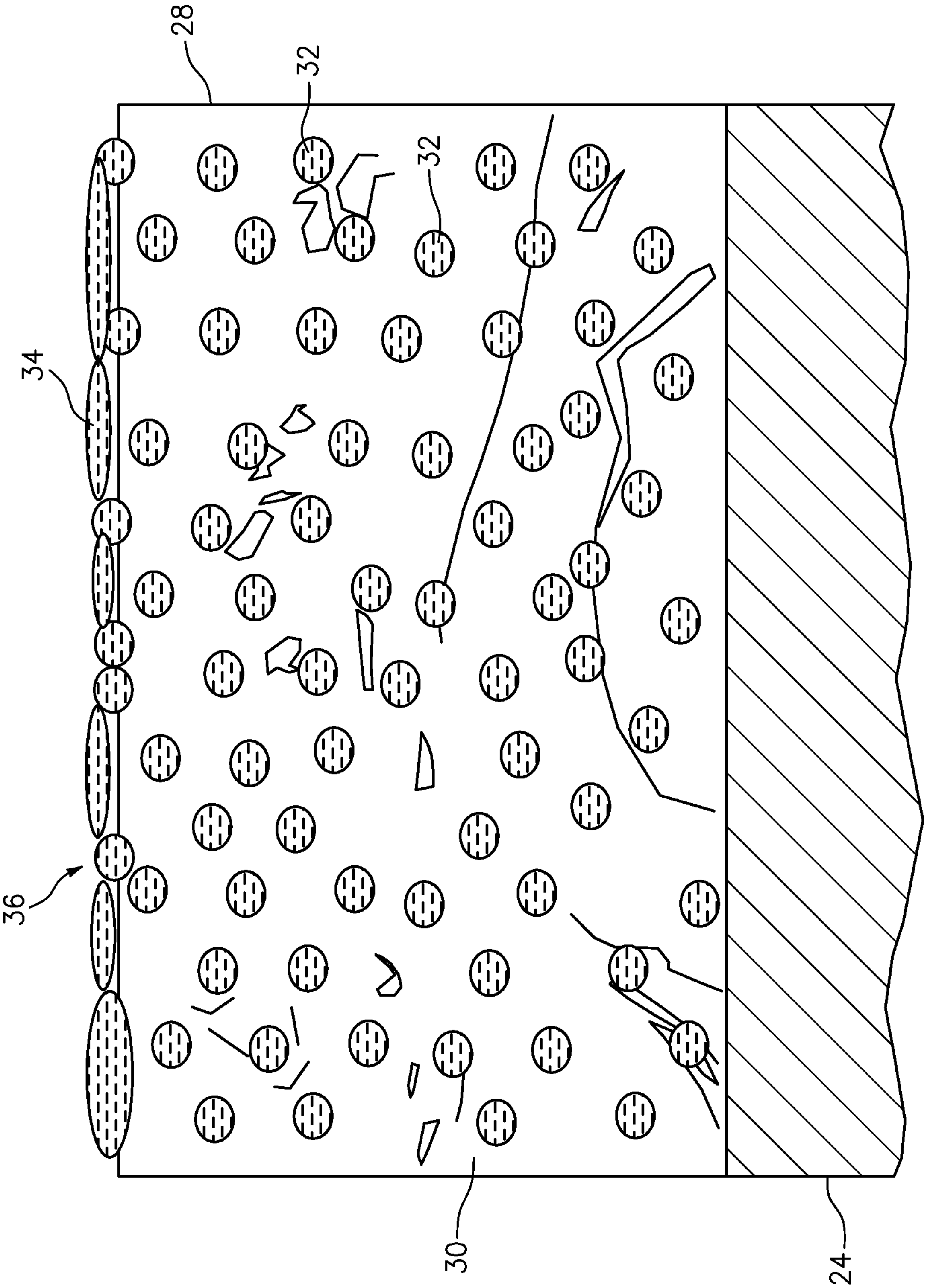
FIG. 4 illustrates a coating of soft metal matrix with interspersed solid lubricant as disclosed herein.

FIG. 4 shows a coating 28 as disclosed herein. As shown, coating 28 includes a soft metal matrix 30, with particles or discrete portions 32 of solid lubricant distributed through matrix 30. In this configuration, the discrete portions 32 of solid lubricant serve to continuously self-lubricate the interface, and because the discrete portions are distributed through coating 28, specifically through the depth of coating 28, even as coating 28 wears down, additional lubricant is exposed to self lubricate the interface by creating and maintaining an $MoS_2$ or otherwise lubricated and lubricious interface or lubricant-based tribofilm 34, at a wear surface 36.

The coating of the present disclosure can be provided from various combinations of soft metal matrix and solid lubricant. The soft metal matrix can for example be metal compositions of a first component selected from the group consisting of copper, nickel or the like with a second component, different from the first component, and selected from the group consisting of nickel, aluminum and/or indium or the like. Specific non-limiting examples of soft metal matrix compositions include CuAl, CuIn, NiIn, CuNi, CuNiIn and combinations thereof.

The solid lubricant can be any composition having desirable lubricious properties. One particular non-limiting example of a solid lubricant that is useful in this disclosure is $MoS_2$. Additional useful solid lubricants include hexagonal boron nitride (hBN), graphite and the like, and combinations thereof. These and other solid lubricants will have different desirable properties under different conditions. As a lubricant, hBN is not as lubricious as $MoS_2$. However, hBN has a higher temperature capability and environmental stability. This can lead to hBN to be advantageous in application methods that use high temperature, or in environments of use where the temperature will be particularly high. When this is not the case, $MoS_2$ has particularly desirable lubricating properties.

The coating as disclosed herein can have a composition by weight percentage of components of between 10 and 20 weight percent solid lubricant, between 2 and 8 weight % of matrix material such as aluminum, and the balance soft metal such as copper. Within these ranges, one non-limiting example of a specific coating composition is 5.0 weight % aluminum, 15 weight % $MoS_2$ and the balance (80 weight %) copper.

The coating as disclosed herein can be applied at a thickness of between 0.001 and 0.005 inches, and one particular non-limiting example is a coating that has a thickness of 0.003 inches.

The coating as disclosed herein can be applied in any manner that results in the solid lubricant material being somewhat uniformly distributed through the matrix material. This can be accomplished by co-depositing the materials, for example utilizing high velocity oxygen fuel (HVOF) application. This leads to desirable distribution of the solid lubricant material through the matrix. Alternatively, the coating could be applied utilizing air plasma spray, flame spray, cold spray, low pressure plasma spray (LPPS) or the like.

When $MoS_2$ is the solid lubricant, it is useful to apply with a process that keeps temperature below about 1100° F. as at this temperature and above, the $MoS_2$ can oxidize and lose the desired lubricity. Further, above 1300° F. the Mo can evaporate. If these high temperatures are needed for other reasons, then an alternate solid lubricant such as hBN can be selected.

In another non-limiting configuration, the solid lubricant can be distributed through the matrix in particles of solid lubricant that have a particle size distribution of −177+10 micro meters (μm).

Figure 5:
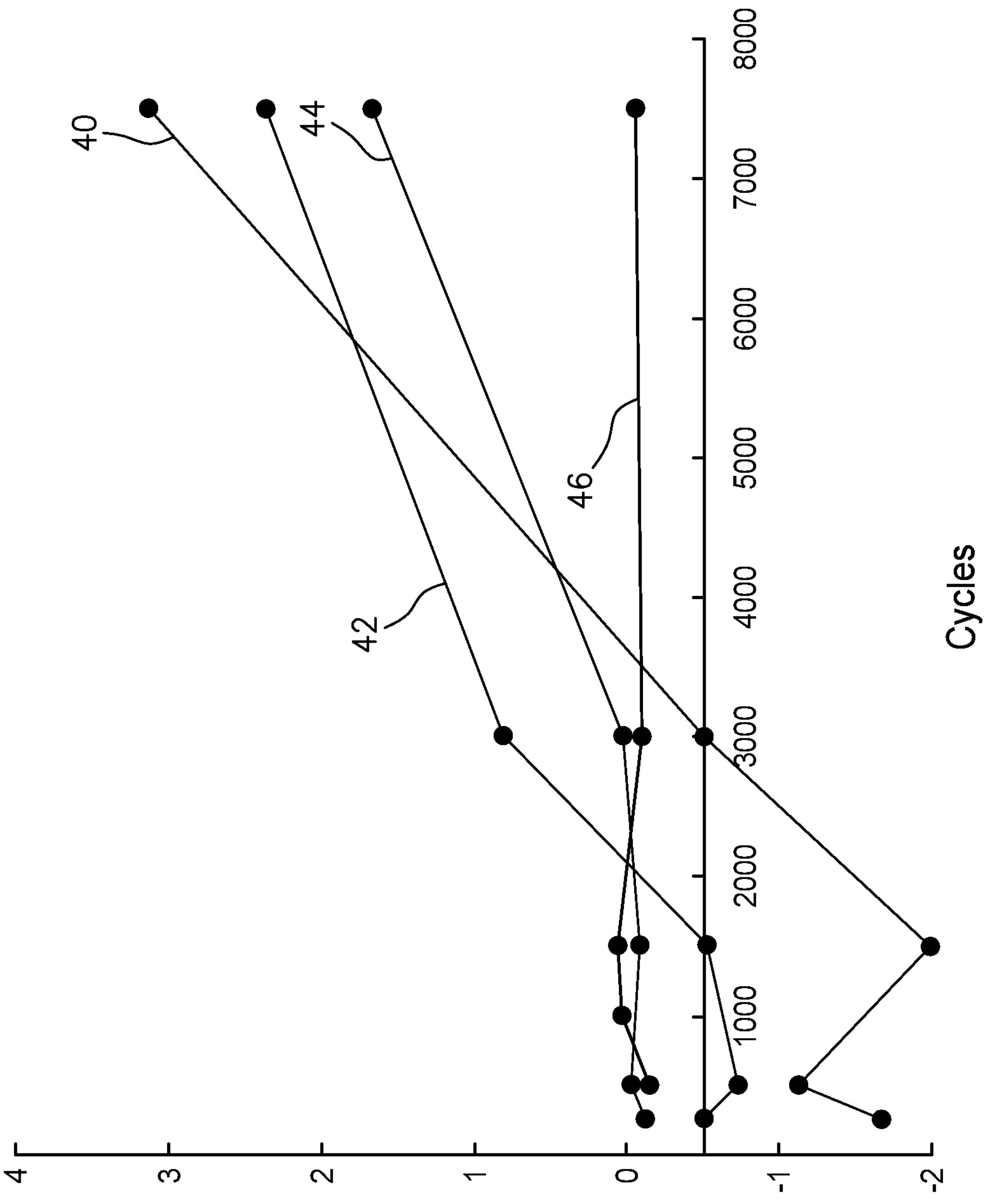
FIG. 5 illustrates normalized total volume loss for interfaces having various protection strategies, a base line with no protection strategy, and an interface as disclosed herein.

Turning to FIG. 5, total volume loss was modeled for various surface interfaces including titanium alloy against titanium alloy (curve 40), CuAl coated titanium alloy (curve 42), titanium alloy coated with CuAl on one surface and $MoS_2$ on both surfaces (curve 44) and an interface coated as disclosed herein with a coating having CuAl matrix and $MoS_2$ distributed through the matrix (curve 46). As shown, the normalized total volume loss with no treatment, shown in curve 40, rises in a steep manner, indicating that significant material is lost at the interface. This is likely to lead to cracking and part failure. In curve 42, it can be seen that volume loss is not as bad as with curve 40, but still the curve increases more steeply than would be desired. When $MoS_2$ is applied in a surface layer, curve 44 shows still further improved results, but still again shows an increase after a certain number of cycles, thus indicating that the interface does not maintain the desired lubricious properties. Finally, in curve 46, it can be seen that the total volume loss starts at and stays substantially at 0, which is a desirable result in terms of protecting blade roots and disks from fretting, high friction and unacceptable wear that can lead to the need for taking the engine out of service to completely replace failed components. This provides a low friction and wear resistant blade root/disk interface capable of operating in high pressure compressors that will significantly increase the endurance life of engine components and significantly reduce overhaul costs by reducing the number of parts that need to be stripped due to wear damage issues.

The present disclosure is made in terms of a coating strategy at the blade root/disk interface, but this strategy could be utilized at other interfaces that are subjected to similar fretting and high friction forces, for example at other locations in a gas turbine engine, particularly in areas where combined conditions of high temperature and significant vibratory motion are experienced.

One or more embodiments of the present disclosure have been described. Nevertheless, it will be understood that various modifications may be made without departing from the spirit and scope of the disclosure. For example, different materials and coating configurations could be utilized, and coatings can be applied utilizing other application methods. Accordingly, other embodiments are within the scope of the following claims.

What is claimed is:

1. A coated blade root/disk interface, comprising:

a blade having a blade root;

a disk having a socket, the blade root being engaged in the socket with contact surfaces defining at least one interface between the blade root and the socket of the disk;

a coating at the at least one interface, wherein the coating comprises a layer of soft metal matrix, and a solid lubricant distributed through the soft metal matrix, wherein the soft metal matrix is CuAl, and wherein the solid lubricant is molybdenum disulfide, wherein the layer contains between 10 and 20 weight percent of solid lubricant, between 80 and 90 weight percent of soft metal matrix, and between 2 and 8 weight percent of aluminum, with balance copper.

2. The coated blade root/disk interface of claim 1, wherein the at least one interface is defined by a blade root surface and an opposed disk surface, and wherein the coating is on at least one of the blade root surface and the opposed disk surface.

3. The coated blade root/disk interface of claim 2, wherein the coating is on both of the blade root surface and the opposed disk surface.

4. The coated blade root/disk interface of claim 1, wherein the layer has a thickness of between 0.001 and 0.005 inches.

5. The coated blade root/disk interface of claim 1, wherein the coating, when exposed to wear, generates a solid lubricant-based tribofilm at a wear surface.

6. The coated blade root/disk interface of claim 1, wherein surfaces of the blade root and the disk that define the at least one interface are titanium alloy surfaces.

7. The coated blade root/disk interface of claim 1, wherein the solid lubricant is distributed through the matrix in particles of solid lubricant that have a particle size distribution of −177+10 micro meters (μm).

* * * * *